(12) United States Patent
Kien et al.

(10) Patent No.: US 6,751,271 B2
(45) Date of Patent: Jun. 15, 2004

(54) DETECTING A CARRIER SIGNAL BY USING A POWER AVERAGING CIRCUIT

(75) Inventors: Thai-Bao H. Kien, Norcross, GA (US); Jiening Ao, Suwanee, GA (US); Lamar E. West, Jr., Maysville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/213,683

(22) Filed: Aug. 6, 2002

(65) Prior Publication Data

US 2004/0028153 A1 Feb. 12, 2004

(51) Int. Cl.$^7$ ............................................... H04L 27/22
(52) U.S. Cl. ........................................................ 375/326
(58) Field of Search ................................ 375/326, 231, 375/325, 147, 324; 455/525

(56) References Cited

U.S. PATENT DOCUMENTS

| | | | | |
|---|---|---|---|---|
| 3,978,407 A | * | 8/1976 | Forney et al. | 375/231 |
| 5,563,914 A | * | 10/1996 | Sogabe | 375/326 |
| 5,796,503 A | | 8/1998 | Junginger et al. | 359/125 |
| 6,137,607 A | | 10/2000 | Feldman et al. | 359/125 |
| 2003/0032441 A1 | * | 2/2003 | Ofuji et al. | 455/525 |

OTHER PUBLICATIONS

Scientific–Atlanta, Inc. Pending Application Ser. #09/840, 767, Filing Date: Apr. 23, 2001, Title: "Burst–Mode Digital Transmitter," Inventors: Joseph Mobley and Lamar E. West, Jr.

Scientific–Atlanta, Inc. Pending Application Ser. ·09/840, 753, Filing Date: Apr. 23, 2001, Title: "Burst–Mode Analog Transmitter," Inventors: Lamar E. West, Jr. and Donald C. Sorenson.

Scientific–Atlanta, Inc. Pending Application Ser. #10/026, 283 Filing Date: Dec. 21, 2001, Title: "HFC Reverse Path Using an Intelligent Dynamic Switch," Inventors: Donald C. Sorenson, David M. Job and Lamar E. West, Jr.

* cited by examiner

*Primary Examiner*—Stephen Chin
*Assistant Examiner*—Curtis Odom

(57) ABSTRACT

The present invention provides an apparatus and method for detecting the presence of a carrier signal that is included in the reverse signals of a communications system. The present invention uses an improved apparatus that determines the average power of the reverse signals during a predetermined counting cycle. The average power is then compared to a threshold power value. If the average power exceeds the threshold power value, an enable signal is provided to allow further transmission of the reverse signals.

5 Claims, 4 Drawing Sheets

DETECTING A CARRIER SIGNAL BY USING A POWER AVERAGING CIRCUIT

RELATED APPLICATIONS

The subject matter of this invention is related to application Ser. No. 10/026,283 entitled "HFC Reverse Path using an Intelligent Dynamic Switch" of which was filed on Dec. 21, 2001; application Ser. No. 09/840,753 entitled "Burst-Mode Analog Transmitter" of which was filed on Apr. 23, 2001; and application Ser. No. 09/840,767 entitled "Burst-Mode Digital Transmitter" of which was filed on Apr. 23, 2001, all of which are assigned to the assignee hereof, and the teachings of which are hereby incorporated by reference herein in their entirety.

FIELD OF THE INVENTION

This invention relates generally to broadband communications systems, such as cable television networks, and more specifically to a carrier-detect device that detects the presence of a carrier signal that is transmitted in the reverse path of the broadband communications system.

BACKGROUND OF THE INVENTION

FIG. 1 is a block diagram illustrating an example of one branch of a conventional broadband communications system, such as a two-way hybrid/fiber coaxial (HFC) network, that carries optical and electrical signals. Such a network may be used in a variety of systems, including, for example, cable television networks, voice delivery networks, and data delivery networks to name but a few. The communications system 100 includes headend equipment 105 for generating forward, or downstream, signals (e.g., voice, audio, video, or data signals) that are transmitted to subscriber equipment 145. Initially, the forward signals are transmitted as optical signals along a first communication medium 110, such as a fiber optic cable. In most networks, the first communication medium 110 is a long haul segment that carries light having a wavelength in the 1550 nanometer (nm) range. The first communication medium 110 carries the forward signal to hubs 115, which include equipment that transmits the optical signals over a second communication medium 120. In most networks, the second communication medium 120 is an optical fiber that is designed for shorter distances, and which carries light having a wavelength in the 1310 nm range.

From the hub 115, the signals are transmitted to an optical node 125 that converts the optical signals to radio frequency (RF), or electrical, signals and provides the signals to one or more output ports that are connected to separate branches of the system. The electrical signals are then transmitted along a third communication medium 130, such as coaxial cable, and are amplified and split, as necessary, by one or more distribution amplifiers 135a–c positioned along the communication medium 130. Taps 140 further split the forward signals in order to provide signals to subscriber equipment 145, such as set-top terminals, computers, telephone handsets, modems, televisions, etc. It will be appreciated that only one branch of the network connecting the headend equipment 105 with the plurality of subscriber equipment 145 is shown for simplicity. However, those skilled in the art will appreciate that most networks include several different branches connecting the headend equipment 105 with several additional hubs 115, optical nodes 125, amplifiers 135a–c, and subscriber equipment 145.

In a two-way network, the subscriber equipment 145 generates reverse RF signals, which may be generated for a variety of purposes, including e-mail, web surfing, pay-per-view, video-on-demand, telephony, and administrative signals from the set-top terminal. These reverse RF signals are typically in the form of modulated RF carriers that are transmitted upstream through the reverse path to the headend equipment 105. The reverse electrical signals from various subscribers are combined via the taps 140 and passive electrical combiners (not shown) with other reverse signals from other subscriber equipment 145. The combined reverse electrical signals are amplified by one or more of the distribution amplifiers 135a–c and typically converted to optical signals by the optical node 125 before being provided to the headend equipment 105. It will be appreciated that in the electrical, or RF, portion of the network 100, the forward and reverse electrical signals are carried along the same coaxial cable 130. In contrast, the forward and reverse optical signals on the first and second communications media 110, 120 are usually carried on separate optical fibers.

The reverse RF carrier signals are generally transmitted within a frequency range from 5 MHz to, for example, 42 MHz. FIG. 2 illustrates a typical reverse band and the frequencies allocated to various services that may be used by the subscriber equipment 145 for the purpose of sending reverse carrier signals. It will be appreciated that the combined reverse carrier signals may include a plurality of reverse carrier signals from a plurality of subscriber equipment. The combined carrier signals may also include a variety of signals in a plurality of frequencies. In addition to the carrier signals, noise and interference is often present in the system. Typically, the noise signals can be viewed with test equipment as essentially a constant level, or noise floor, that most particularly affects the reverse path signals. Disadvantageously, the noise signals interfere with the processing of the valid carrier signals with the headend equipment.

When necessary, the presence of a valid carrier signal in the reverse path is typically detected among the noise signals by examining the instantaneous power level of the RF signal. For example, if the power level of the RF signal is above a predetermined threshold for a predetermined amount of time, e.g., at least 2 microseconds during any 8 microsecond window, the RF signal is treated as a valid RF carrier signal. Otherwise, the reverse signal is treated as just noise and interference. This carrier-detect scheme works adequately for narrowband noise that has a predictable noise floor; however, wideband noise, which has a high peak to average power ratio in the time domain, can exceed the preset threshold for 2 microseconds in an 8 microsecond window even though its average power level is low.

The present invention is, therefore, directed to an improved carrier-detect circuit that detects a valid reverse carrier signal. As a result, the HFC network's reverse path signaling capacity, quality, and reliability are greatly enhanced.

SUMMARY OF THE INVENTION

The present invention is directed toward an improved carrier-detect circuit that detects a valid reverse carrier signal. More specifically, a power averaging carrier-detect device determines the presence of at least one desired RF carrier signal. The device determines if a reverse carrier signal is present by averaging the power level of the reverse signals by analyzing each input sample bit by bit to determine the power level over a certain period of time.

DETAILED DESCRIPTION OF A PREFERRED EMBODIMENT

The present invention will be described more fully hereinafter with reference to the accompanying drawings in which like numerals represent like elements throughout the several figures, and in which exemplary embodiments of the invention are shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. For example, although the present invention is described in the context of the intelligent dynamic switch, the present invention is not limited to this electronic device. More specifically, the present invention can also be included in the burst-mode analog transmitter as described in co-pending, commonly assigned, patent application Ser. No. 09/840,753, the teachings of which are hereby incorporated by reference. Furthermore, the present invention can be included in the burst-mode digital transmitter as described in co-pending, commonly assigned, patent application Ser. No. 09/840,767, the teachings of which are incorporated by reference. Moreover, although the reverse RF carrier signals are typically modulated with data signals originating at the subscriber equipment, these RF carrier signals could also include additional types of signal modulation, such as voice or video. The present invention is described more fully hereinbelow.

Intelligent Dynamic Switch (IDS)

Generally described, an intelligent dynamic switch (IDS) reduces the problem of reverse noise signals by allowing a reverse signal to proceed further along the reverse path only if a desired carrier signal is present. The IDSs will be deployed at a variety of points in the network. If an IDS determines that no desired carrier signal is present at that point in the network, it will prevent the transmission of any reverse signal, thereby preventing the transmission of reverse noise signals beyond that point in the network.

Figure 3:
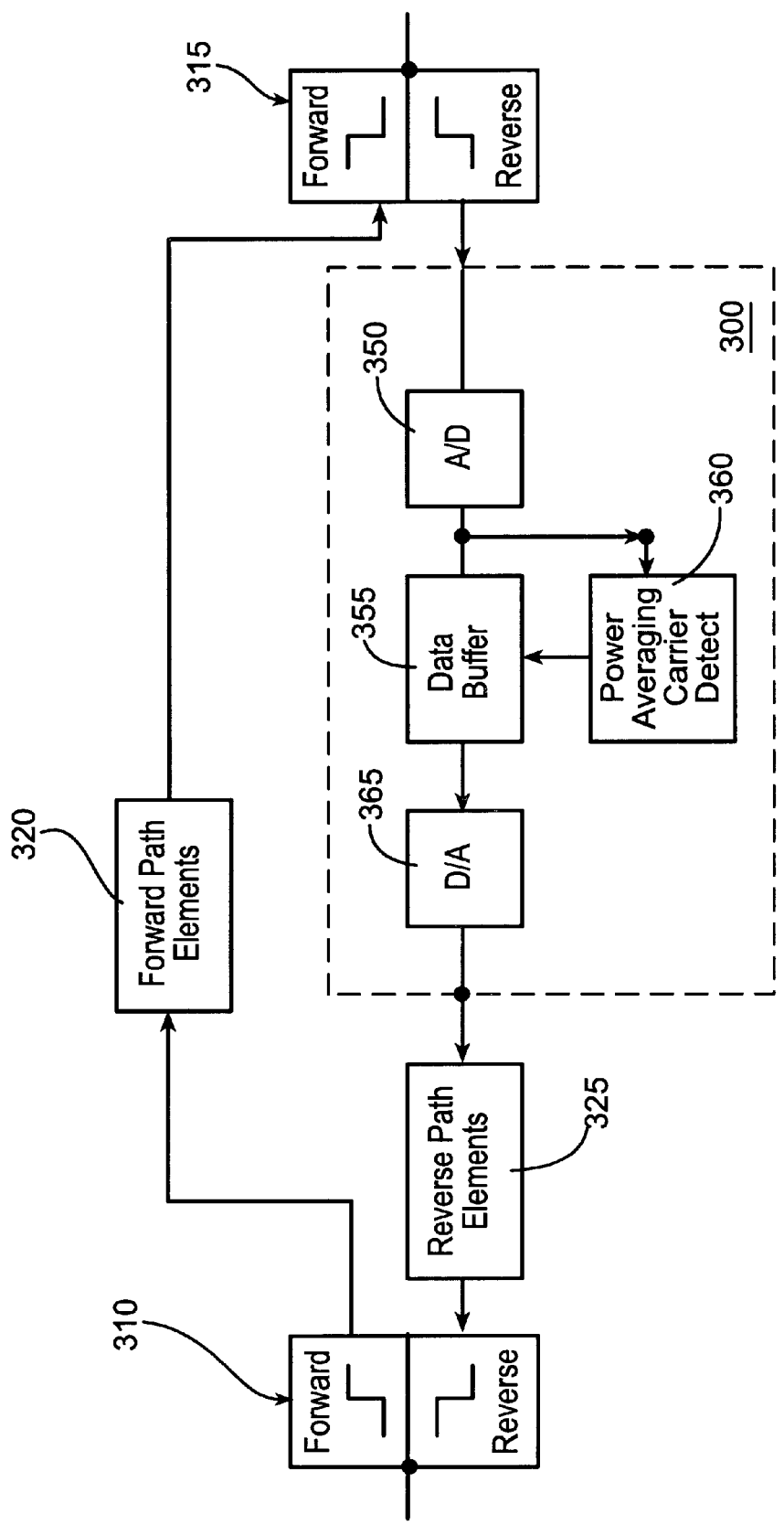
FIG. 3 illustrates a block diagram of an intelligent dynamic switch in accordance with the present invention that controls the transmission of reverse RF signals in the reverse path of the broadband communications network of FIG. 1.

The basic elements of an exemplary IDS are shown in the block diagram of FIG. 3. The concept proposed herein uses an intelligent switch to allow transmission of reverse RF signals only when the IDS 300 detects a reverse RF carrier signal. As shown in FIG. 3, there are five main elements related to the IDS 300. They are:

1) Converting reverse RF signals received at the IDS 300 to digital signals that represent the received RF signals.

2) Detecting when a reverse RF carrier signal is present subsequent to digitizing the reverse analog signals.

3) Delaying or buffering the digital signals.

4) Releasing the buffered signals only when at least one RF carrier signal is present.

5) Converting the digital signals back to analog signals.

Figure 1:
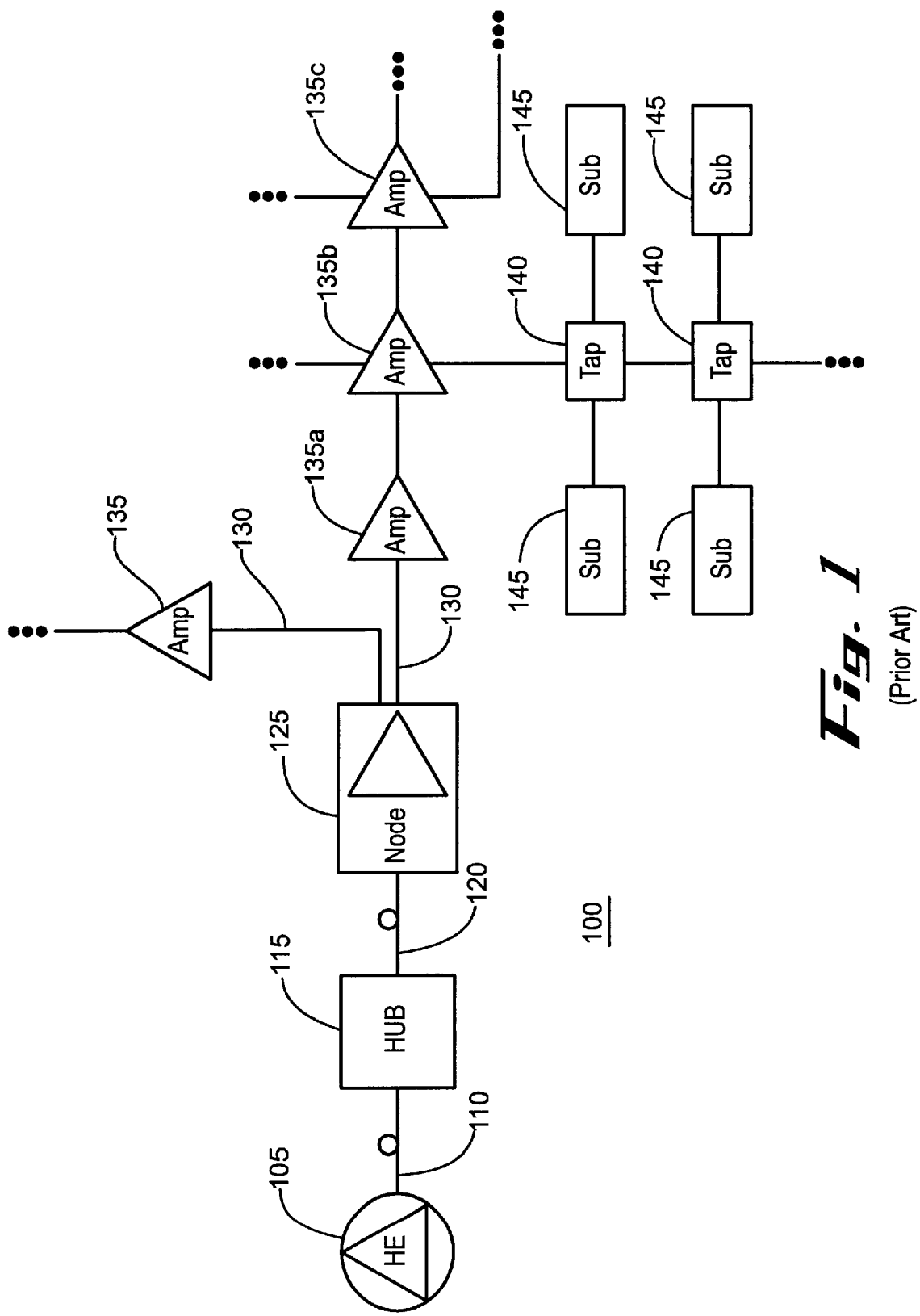
FIG. 1 illustrates an example of one branch of a conventional broadband communications network, such as a two-way HFC cable television network, that carries optical and electrical signals.

FIG. 3 illustrates an embodiment in which the IDS 300 is included within a conventional communications device 305, such as a tap 140 (FIG. 1) or amplifier 135 (FIG. 1). When the communications device 305 is used in the RF distribution network, forward and reverse signals are typically transmitted through the device 305. In this manner, diplex filters 310, 315 are used to separate the forward and reverse signals. A high pass filter isolates the forward signals, which are typically within a band that ranges from 50 MHz to 870 MHz, and provides the forward signals to conventional forward path elements 320 associated with the communication device 305. The forward signals then pass through diplex filter 315 before being transmitted further downstream in a conventional manner.

Reverse signals received at diplex filter 315 are filtered via a low pass filter and provided to the IDS 300. The reverse RF signals are passed from the IDS 300 to conventional reverse path elements 325 only after the IDS 300 determines that there is a valid RF carrier signal present within the reverse RF signals. A low pass filter in diplex filter 310 isolates the reverse signals from the forward signals and allows transmission upstream to the headend. It will be appreciated that the IDS 300 can also be a stand-alone product so long as appropriate diplex filters are used to isolate the forward and reverse signals in a two-way network.

In accordance with the operation described above, the IDS 300 only allows transmission of reverse RF signals when an RF carrier signal is present. This effectively blocks the transmission of noise signals until such time as the IDS 300 allows the reverse RF signals to pass through. Significantly, this device and method reduces the noise signals that conventionally are transmitted and aggregated continuously through the reverse path, thereby allowing greater quality signal processing at the headend, and is discussed in further detail below.

An Exemplary Embodiment of an Intelligent Dynamic Switch

As illustrated in FIG. 3, an embodiment of an IDS includes an analog-to-digital (A/D) converter 350, a data buffer 355, a carrier-detect circuit 360, and a digital-to-analog (D/A) converter 365. A description of the primary elements of the IDS 300 follows.

Analog-to-Digital Converter—350/Digital-to-Analog Converter—365

The A/D converter 350 receives a reverse analog RF signal that is a composite of one or more reverse RF carriers. The reverse RF signals originate with one or more of the subscribers that are located downstream from the communication device 305. Those skilled in the art will appreciate that if the communication device 305 is a tap, the number of subscribers downstream from the tap may be as few as two or four, and that if the communication device 305 is an amplifier, the number of subscribers downstream from the amplifier may be as high as several thousand. Those skilled in the art will also appreciate that the reverse band is typically from 5 MHz to 42 MHz in U.S. cable television networks, and from 5 MHz to 65 MHz in European cable television networks.

Figure 2:
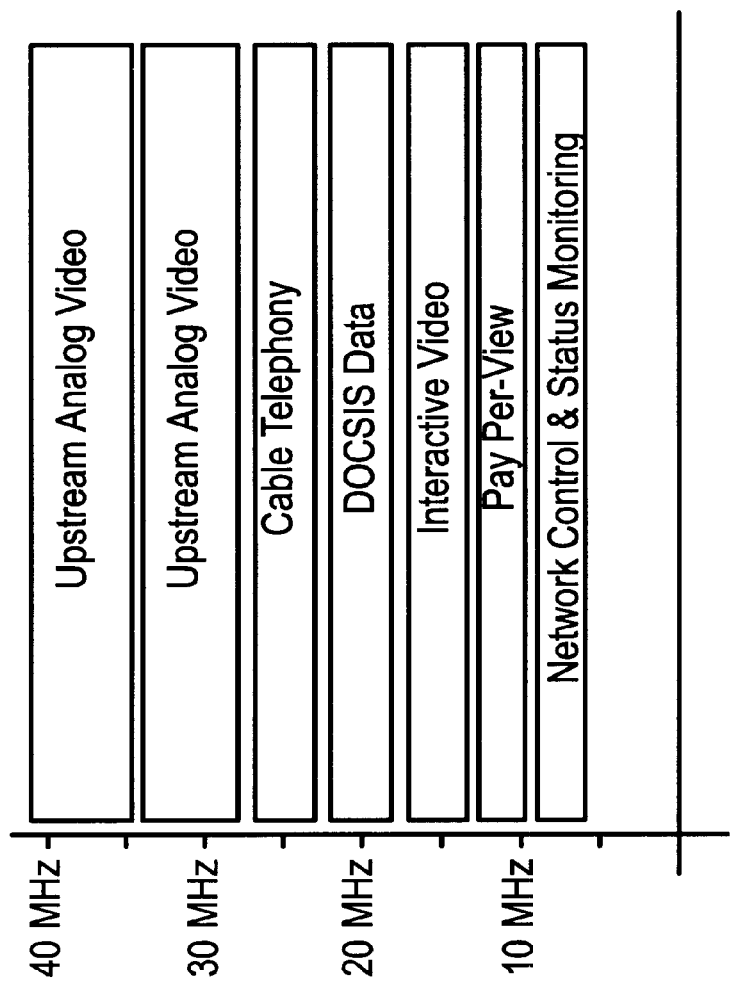
FIG. 2 illustrates a typical reverse band and the frequencies allocated to various services that may be used by the subscriber equipment for the purpose of sending reverse carrier signals.

The composite RF signal received at the A/D converter 350 will include RF carrier signals if any of the subscriber equipment located downstream is sending signals back to the headend. The nature of the reverse service signals being transmitted back to the headend for processing depend upon the services that employ the reverse path, such as impulse pay-per-view (IPPV), video on demand, cable modem signals, etc. Commonly, carrier signals for different reverse services are sent in independent frequency bands as shown in FIG. 2.

It will be appreciated that digitization of an analog signal is known in the telecommunications industry and others, for example, as a means of converting a single baseband video or voice signal to a digital signal format. The conversions for these single signals, however, are accomplished using an A/D converter having a very low sampling rate. In contrast, reverse broadband communications signals used in a broadband cable television network require a significantly higher sampling rate. Those skilled in the art will be familiar with the Nyquist theory, which states an analog signal must be sampled at a frequency that is greater than twice the maximum signal bandwidth in order to ensure that all information can be extracted and the inherent aliasing will not corrupt the original signal. In a conventional HFC communications network, the A/D and D/A converters operate with a sampling clock of typically 100 MHz with a packet size of 10 or 12-bits. The need for a sampling rate of 100 Megasamples per second (Ms/s), which is essentially equivalent to a 100 MHz sampling clock, is determined by understanding that the reverse RF bandwidth in the U.S. ranges from 5 MHz to 42 MHz. The sampling rate, therefore, should be no less than 84 Ms/s, and is typically increased to 100 Ms/s because a practical anti-aliasing filter requires some transition bandwidth. A sampling rate of 150 Ms/s is used for a reverse band ranging from 5 MHz to 65 MHz. The higher sampling rate substantiates the requirement of a more robust and complex A/D and D/A converter to digitize the entire bandwidth of the HFC reverse path broadband signals compared to that required for a single signal.

Accordingly, the A/D converter 350 receives the reverse RF signals and digitizes the received RF waveform producing a signal that is represented by parallel digital bits. The parallel digital output of the A/D converter 350 is then provided to data buffer 355.

An Exemplary Embodiment of a Power Averaging Carrier-Detect Device—360

The present invention is directed towards a power averaging carrier-detect device 360 that is suitable for use in the IDS 300 of FIG. 3. The main function of the carrier-detect device 360 in accordance with the present invention is to determine more accurately the presence of at least one desired RF carrier signal within the entire received reverse bandwidth (e.g., 5 MHz to 42 MHz). In accordance with the present invention, the power averaging carrier-detect device 360 determines if a reverse carrier signal is present by averaging the power level of the reverse signals. More specifically, the carrier-detect device 360 analyzes each input sample bit by bit to determine the power level over a certain period of time, such as 8 microseconds.

Figure 4:
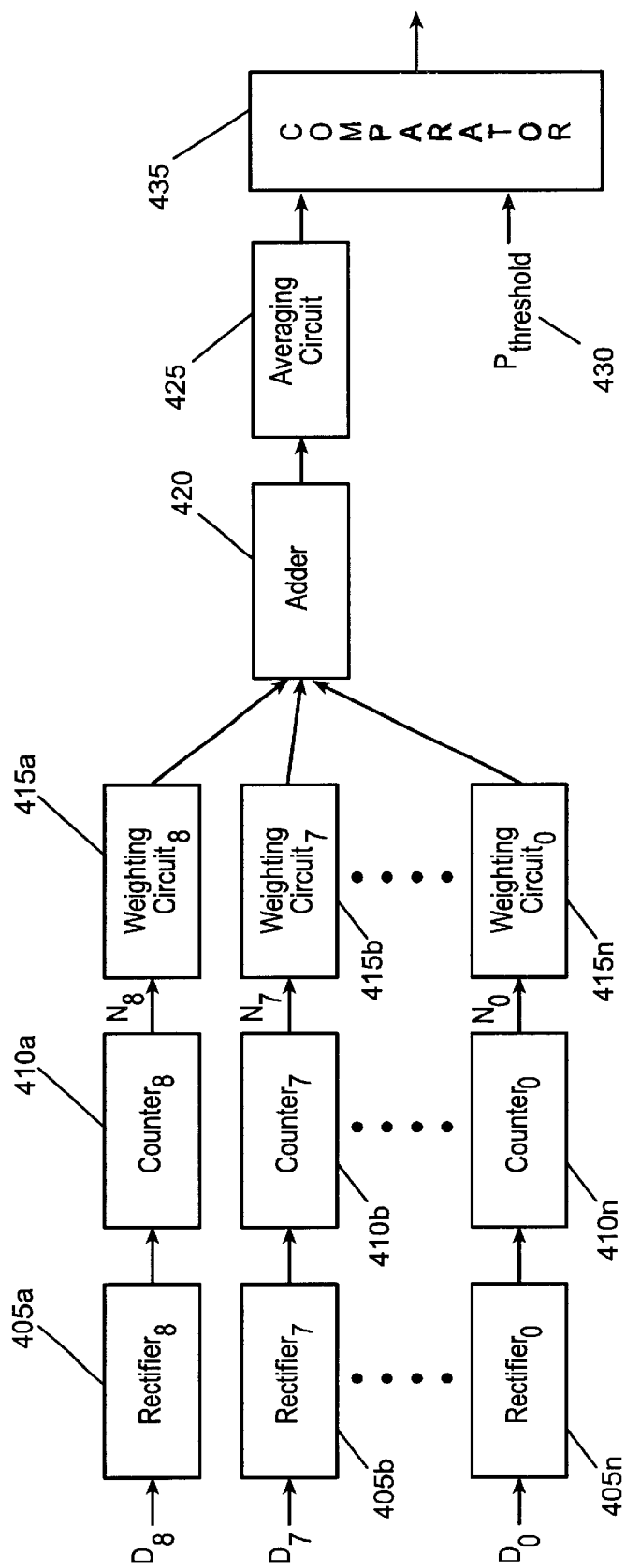
FIG. 4 illustrates a power averaging carrier-detect device in accordance with the present invention that is suitable for use in the intelligent dynamic switch of FIG. 3.

FIG. 4 illustrates the power averaging carrier-detect device 360 in accordance with the present invention using the parallel output of a 10-bit 100 MHz A/D converter. It will be appreciated that the number of bits and the frequency are used as an example for discussion purposes and are not intended to limit the invention. Assuming the A/D converter 350 is set at the offset binary mode, for example, and the most significant bit (MSB) D9 of the 10-bit sample is a sign bit, each non-sign bit (i.e., D8–D0, which are each represented as either a one or a zero) is provided to a rectifier 405a–n for rectification and to detect the bit's power level. After full-wave rectification, the power level can simply be determined by implementing either-or logic gates that provides either a one or a zero. Each rectified bit is then provided to a corresponding counter 410a–n, which counts the number of ones. Each of the counters 410a–n adds the number of ones that was detected during a counting cycle, which can be, for example, 800 sample bits per cycle, or alternatively, 800 words per cycle where 10 bits comprise a digital word. A weighting circuit 415a–n receives the total number of ones from each respective counter 410a–n during each counting cycle. Each weighting circuit 415a–n weights the number of ones according to the bit's power ratio. More specifically, the power ratio for the most significant bit (MSB) D8 is 2 and the power ratio for the least significant bit (LSB) D0 is 512, which are powers from one to nine given that in this example there are nine non-sign bits that are evaluated. Each weighting circuit 415a–n thereinbetween divides the number of ones (N8–N0) by the power of its bit position (i.e., N8/2, N7/4, N6/8, N5/16, N4/32, N3/64, N2/128, N1/256, N0/512).

An adder 420 adds all the weighted numbers from each weighting circuit 415a–n and then divides the added number by an averaging circuit 425. The averaging circuit 425 divides by the number of total sample bits that are included in a counting cycle, i.e., 800. The algorithm for a 9-bit circuit where the A/D converter outputs a 10-bit word during an 800-bit counting cycle can be expressed as the following equation:

$$P_{AVE}=(N8/2+N7/4+N6/8+N5/16+N4/32+N3/64+N2/128+N1/256+N0/512)/800.$$

A comparator 435 then compares the resulting average power level, $P_{AVE}$, to a power threshold value 430 to determine whether the reverse signal contains a valid carrier signal. If a valid carrier signal has been determined, an enable signal goes high to enable the IDS 300.

Data Buffer—355

Referring again to FIG. 3, data buffers are well known in the art and are easily designed depending upon their application. A low-cost digital data buffer that uses registers or random access memory (RAM) introduces a delay that is necessary to give the carrier-detect circuit 360 sufficient time to detect the presence of a desired RF carrier signal. In a preferred embodiment of the digital data buffer 355, a 10-bit 800 samples stage first-in-first-out (FIFO) delay line 355 is used to introduce the delay. Once an RF carrier signal is detected, the carrier-detect circuit 360 controls the data buffer 355 with the enable signal to allow the delayed digital signals to pass through. The digital signals are provided to the D/A converter 365 where they are converted back to analog RF signals for processing by the conventional reverse path elements 325.

From the foregoing description, it will be appreciated that the present invention provides an apparatus and method for detecting the presence of a valid carrier signal. Advantageously, the power averaging carrier-detect device 360 determines the presence based upon the average power of the digital bits, so it works well not only for a continuous wave signal, but also for a modulated signal and wideband noise signals.

The present invention has been described in the relation to particular embodiments, which are intended in all respects to be illustrative rather than restrictive. For example, although the present invention has been described in the context of the intelligent dynamic switch, those skilled in the art will understand that the principles of the present invention may be applied to, and embodied in, communications devices that need to detect the presence of reverse carrier signals. In addition, the present invention need not be limited to the reverse path but can also be included in the forward path during certain situations.

Alternative embodiments will become apparent to those skilled in the art to which the present invention pertains without departing from its spirit and scope. Accordingly, the scope of the present invention is defined by the appended claims rather than by the foregoing description.

What is claimed is:

1. In a communications system for transmitting forward and reverse signals, the reverse signals including carrier signals and noise signals, a method of detecting at least one carrier signal comprising the steps of:
    digitizing the reverse analog signals to provide a plurality of digital bits, wherein the plurality of digital bits comprise a digital word, wherein for each of the plurality of digital bits;
        receiving a digital bit, the digital bit having a power ratio and a power level;
        determining the power level for each digital bit;
        adding the power level of the digital bit with the power level of additional digital bits having a common power ratio throughout the counting cycle; and
        weighting the added number in accordance with the power ratio;
    adding the weighted numbers for the plurality of digital bits; and
    averaging the added number in accordance with a counting cycle to provide an average power level;
    comparing the average power level with a threshold power level,
    wherein when the average power level exceeds the threshold power level, providing an enabling signal indicating the presence of the at least one carrier signal.

2. The method of claim 1, further comprising the steps of:
    delaying the plurality of digital bits;
    releasing the digital reverse signal upon receiving the enabling signal; and
    converting the digital reverse signal back to a reverse analog signal.

3. In a communications system for transmitting forward and reverse signals, the reverse signals including carrier signals and noise signals, the communications system including a dynamic switch, the dynamic switch comprising:
    an input port for receiving a first reverse analog signal from a first portion of the communications system;
    an analog-to-digital converter for converting the first reverse analog signal to a digital signal, the digital signal including a plurality of digital signal values;
    a carrier-detect circuit coupled to the analog-to-digital converter for detecting the presence of at least one carrier signal, the carrier-detect device comprising:
        a plurality of rectifying means each for receiving a digital signal value and for determining a power level, wherein the power level is one of a zero and a one;
        a plurality of counting means each coupled to a rectifying means for providing a total number of ones associated with the power level during a counting cycle;
        a plurality of weighting means each coupled to a counting means for weighting the total number of ones dependent upon a power ratio associated with the digital signal value;
        adding means coupled to the plurality of weighting means for adding the weighted number of ones;
        an averaging circuit for averaging the weighted number of ones based on the counting cycle and for providing an average power level; and
        a comparator for comparing the average power level with a threshold power level, wherein when the average power level is greater than the threshold power level, an enable signal is provided;
    a buffer for temporarily storing the digital signal values and for outputting the digital signal values when the enable signal is received;
    a digital-to-analog converter for receiving the digital signal values from the buffer and for converting the digital signal values into a second reverse analog signal corresponding to the first reverse analog signal; and
    an output port for providing the second reverse analog signal to a second portion of the communications system,
    whereby the second reverse analog signal is provided to the second portion of the communications system only when the carrier-detect circuit determines that the average power level of the digital signal value exceeds the threshold power level.

4. In a communications system having forward and reverse paths for transmitting forward and reverse analog signals, respectively, the reverse analog signals including carrier signals and noise signals, the communications system including an electronic device, the electronic device including:
    a first diplex filter having a high pass filter and a low pass filter, the high pass filter for isolating the forward signals, and the low pass filter for isolating the reverse analog signals;

forward path elements coupled to the high pass filter of the first diplex filter for processing;

a second diplex filter having a high pass filter and a low pass filter, the high pass filter coupled to the forward path elements for providing the processed forward signals to the forward path, and the low pass filter for receiving reverse analog signals;

a dynamic switch coupled to the low pass filter of the second diplex filter, the dynamic switch comprising:

digitizing means for converting a reverse analog signal to a digital signal having a predetermined number of digital bits;

detecting means for detecting when at least one reverse carrier signal is present in the digital signal, the detecting means comprising:

an averaging circuit for averaging a power level associated with the digital bits during a counting cycle and for providing an average power level; and a comparator for comparing the average power level with a threshold power level, wherein when the average power level exceeds the threshold power level, an enable signal is provided indicating the presence of the at least one reverse carrier signal;

a buffer for delaying the digital signal and for releasing the delayed signal in response to the enable signal; and converting means for converting the delayed signal back to the reverse analog signal; and reverse path elements coupled to the dynamic switch for processing and for providing the processed reverse analog signal to the low pass filter of the first filter, whereby upon detection of the at least one reverse carrier signal, the reverse analog signal is provided to the reverse path elements.

5. The electronic device of claim 4, the averaging circuit comprising:

a plurality of rectifying means each for receiving a digital bit and for determining the power level, wherein the power level is one of a zero and a one;

a plurality of counting means each coupled to a rectifying means for providing a total number of ones associated with the power level during the counting cycle;

a plurality of weighting means each coupled to a counting means for weighting the total number of ones dependent upon a power ratio associated with the digital bit;

adding means coupled to the plurality of weighting means for adding the weighted number of ones; and a divider circuit for averaging the weighted number of ones based on the counting cycle and for providing the average power.

* * * * *